A. G. SIMMONS.
WATERING TROUGH.
APPLICATION FILED JULY 19, 1910.

977,561.

Patented Dec. 6, 1910.

WITNESSES
F. E. Smith
B. H. Beckwith

INVENTOR
Arthur G. Simmons
BY
Chas. R. A. Smith
ATTY.

UNITED STATES PATENT OFFICE.

ARTHUR G. SIMMONS, OF BOSTON, MASSACHUSETTS, ASSIGNOR TO SIMMONS MANUFACTURING COMPANY, OF BOSTON, MASSACHUSETTS, A CORPORATION OF MASSACHUSETTS.

WATERING-TROUGH.

977,561.  Specification of Letters Patent.  Patented Dec. 6, 1910.

Application filed July 19, 1910. Serial No. 572,948.

*To all whom it may concern:*

Be it known that I, ARTHUR G. SIMMONS, a citizen of the United States, residing at Boston, in the county of Suffolk and State of Massachusetts, have invented certain new and useful Improvements in Watering-Troughs, of which the following is a specification, reference being had therein to the accompanying drawings.

My invention relates to improvements in watering troughs particularly that class of watering troughs used by cities and towns in the principal streets and squares for the watering of horses.

The main object of my invention is the providing of means for directing the flow of water toward the center of the trough in such a way that the scum and other foreign substances are removed from the water and the water, especially the surface water kept clean at all times, thereby eliminating all danger of the drinking animals catching glanders and other contagious diseases.

Another object of my invention is the providing of means for keeping the water always at the proper height within the trough so as to absolutely insure the passing off of the surface scum in the shortest time possible.

A still further object is the providing of means for preventing the breaking of the watering trough by the bumping of a wagon pole.

With these objects in view, this invention consists in certain novel features of construction, and in certain parts, improvements, and combinations as will be hereinafter fully described and pointed out in the claims.

Figure 1:
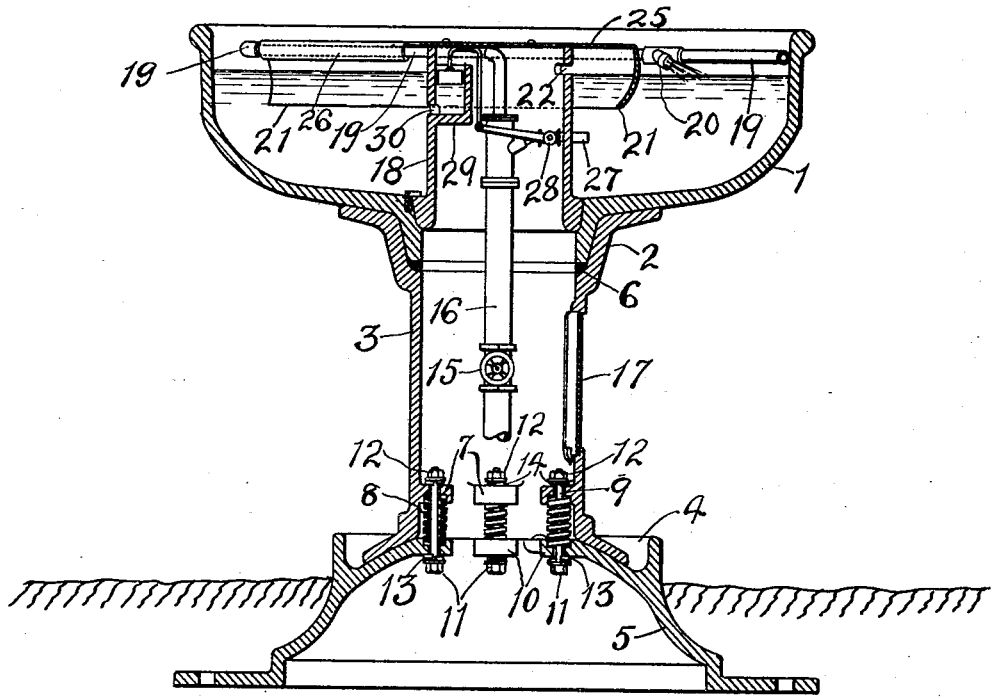
Figure 2:
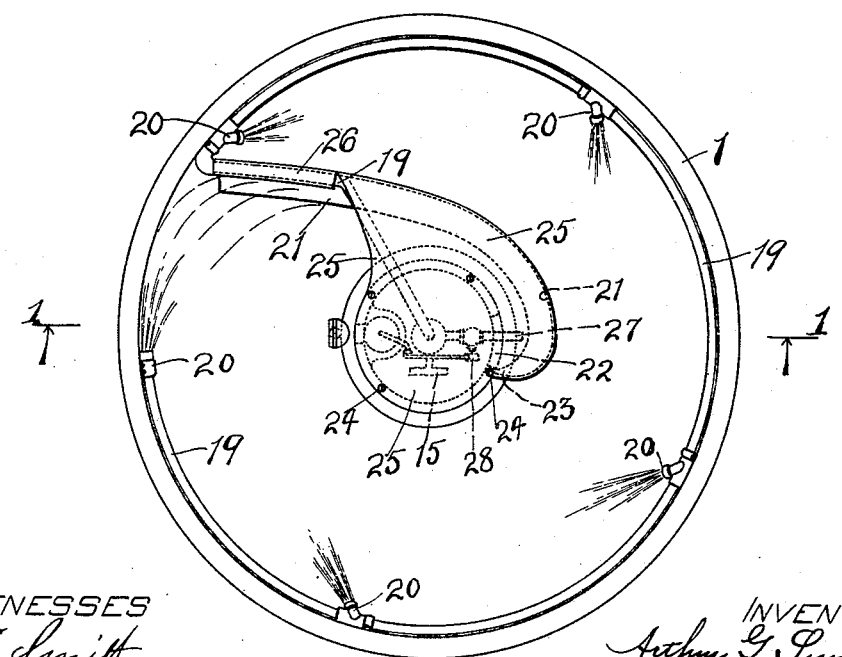

In the accompanying drawings, Figure 1 is a vertical cross section on line 1—1 of Fig. 2. Fig. 2 is a plan view of my invention.

Corresponding and like parts are referred to in the following description and indicated in all the views of the drawings by the same reference characters.

The tank 1 of the watering trough is preferably a cylindrical receptacle constructed of metal, concrete or stone, which rests within the socket 2 of the tubular standard 3, a buffer ring 6 of resilient material being placed between the lower inner circumference of the tank and the inner side of the socket, to prevent breakage of the tank or standard when the tank or standard has been tilted by the wagon pole as the team of horses pull the pole against the watering trough in their desire to get at the water.

The lower portion of the standard is seated in the pit 4 of the pedestal 5, this pedestal being provided with the ledge 10 slotted to form seats for the compression helical springs 8 and through which ledge and springs pass the bolts 9. These bolts are provided with the spring gaskets 13 placed thereon between their heads and the lower side of the ledge. The lower inner portion of the standard has a series of inwardly extending integral lugs 7 and the extreme inner portion of each is bent downward to form a guide for the upper portion of the spring 8. These bolts pass upward through the lugs, being threaded at their outer ends to receive nuts 12, the gaskets 14 being placed on the bolts between the nuts and the upper side of the lugs.

Access to the nuts 12 and valve 15 of the supply pipe 16 is obtained through the door 17. This water supply pipe passes upward through the standard and large drainage pipe 18 and carries at its upper end the smaller tube 19 which extends across to the inner side of the rim of the tank 1 and extends nearly around the inner side rim of the upper portion of the tank. The tube 19 is provided with a series of nozzles 20 which throw a plurality of streams of water at an angle into the tank so as to cause a rotating motion to the water and force the scum and other oily substances on or near the surface of the water to pass against the curved or hook run-way 21. This run-way or guide-way 21 is preferably concaved on that side against which the scum is directed so that the scum and other surface substances will be passed along by the run-way and flow through the elongated opening 22 in the upper portion of the large drainage pipe 18, which pipe extends above the surface of the water and supports the outer or hook end 23 of the run-way. To this pipe is also secured by means 24 the cover plate 25 which is made integral with the run-way and acts as a cover plate for the hook portion of the run-way and for the top of the drainage pipe so that horses are unable to put their mouths into that portion of the run-way or into the drainage pipe.

In order that the run-way may be kept constantly cleaned its entire length and the scum not allowed to collect on its portion adjacent to the rim of the tank, the end and largest nozzle on the pipe throws its stream not at an angle into the tank, as is the case with the other nozzles, but throws it along the inner rim of the tank so as to swash the side of the tank adjacent to the run-way and move the scum along the run-way toward the hook end. The run-way is also provided with a tubular portion 26 which is slid over or partly or wholly encircles the straight portion of the tube 19 situated between the rim of the tank and that portion of the tube concealed by the cover plate. This tube is of a size sufficient to carry enough water for what is ordinarily drank by the horses from this trough plus enough water to keep the surface water clean by carrying the scum and other substances through the opening 22; therefore it is readily seen that in a location where a number of horses are constantly drinking that the tube will have to be larger than it would have to be in a location where horses only occasionally drink. In order however to be always sure that the scum is being swashed through the opening 22 and the water level above the opening, I have provided a secondary piping 27 extending from the water supply pipe 16 and provided with a float valve 28, the water passing into the tank 29 through the opening 30.

Having thus described my invention, I claim:

1. In a watering trough the combination with a central drainage pipe of a curved runway partly encircling the pipe and against which run-way the flow of scum is directed and passed to an opening in the pipe.

2. In a watering trough the combination with a drainage pipe having an opening in its side of a curved guide-way extending from a point near the inner rim of the trough and partly around the pipe so that a passage for the water is formed between the pipe and the inner concaved side of the guide-way and its extreme end secured to the pipe thus causing water swashed down the passage to pass through the opening in the pipe.

3. A watering trough provided with an inwardly extending guide-way having its inner end shaped in the form of a hook.

4. A watering trough provided with an inwardly extending guide-way and a coverplate for the inner portion of the guide-way.

5. A watering trough provided with an inwardly extending hook run-way in combination with a piping having its nozzle in close proximity to the inner side of the trough and near the run-way so that water passing from the piping is swashed the entire length of the run-way.

6. A watering trough in combination with a central drainage pipe and an inwardly-extending hook run-way having a cover plate formed integral therewith and extending over the top of the drainage pipe.

7. In a watering trough a central drainage pipe, a water supply pipe extending upward through the drainage pipe to a point above the water line of the trough and thence to the inner rim of the trough and around the inner side of the rim, a hooked shaped guide-way secured to said water supply pipe, having its inner side concaved and its outer side convexed, a series of nozzles carried by the water supply pipe situated above the water line and through which water is forced to swash the surface scum toward the concaved surface of the guide-way, and means extending into the trough below the water level for supplying additional water when the water in the trough is below water level.

8. In a watering trough for horses and other animals, a water supply pipe, a tube extending from the water supply pipe provided with a series of nozzles, a secondary tube extending from the pipe and a float valve for said secondary tube, substantially as shown and described.

9. In a watering trough for horses and other animals, a base portion, a standard, means connecting the standard and base portion, a tank, and a resilient buffer between the tank and upper portion of the standard.

10. In a watering trough, a base portion, a standard, spring retaining means connecting the standard and base portion and a movable tank carried by the standard.

In testimony whereof I affix my signature in presence of two witnesses.

ARTHUR G. SIMMONS.

Witnesses:
CHARLES F. A. SMITH,
FRANCIS E. SMITH.